(12) United States Patent
Zhang

(10) Patent No.: US 11,597,324 B2
(45) Date of Patent: Mar. 7, 2023

(54) GOLF CART STEP RAIL KIT

(71) Applicant: Yujie Zhang, Greenville, SC (US)

(72) Inventor: Yujie Zhang, Greenville, SC (US)

(*) Notice: Subject to any disclaimer, the term of this patent is extended or adjusted under 35 U.S.C. 154(b) by 79 days.

(21) Appl. No.: 17/076,947

(22) Filed: Oct. 22, 2020

(65) Prior Publication Data

US 2022/0126753 A1  Apr. 28, 2022

(51) Int. Cl.
*B60R 3/00* (2006.01)

(52) U.S. Cl.
CPC .................................. *B60R 3/002* (2013.01)

(58) Field of Classification Search
CPC .................................................. B60R 3/002
See application file for complete search history.

(56) References Cited

U.S. PATENT DOCUMENTS

| 5,193,829 A   * | 3/1993 | Holloway | B60R 3/002 280/166 |
| 10,011,231 B1 * | 7/2018 | Wymore | B60R 3/002 |
| 2016/0031376 A1 * | 2/2016 | Stickles | B60R 3/002 280/166 |
| 2019/0126833 A1 * | 5/2019 | Wymore | B60R 3/002 |

* cited by examiner

*Primary Examiner* — Bryan A Evans
(74) *Attorney, Agent, or Firm* — Dority & Manning, P.A.

(57) ABSTRACT

A side rail kit for a golf cart includes a frame bracket mountable to a frame of the golf cart. A pair of step brackets are mountable to the frame bracket. The step brackets extend from the frame member when the step brackets are mounted to the frame bracket. A distal end portion of each of the step brackets is spaced from the frame bracket when the step brackets are mounted to the frame bracket. A step rail is mountable to the step brackets.

18 Claims, 8 Drawing Sheets

GOLF CART STEP RAIL KIT

FIELD OF THE INVENTION

The present subject matter relates generally to nerf bars or step rails for golf carts.

BACKGROUND OF THE INVENTION

A golf cart generally includes a suspension that connects the golf cart's frame and wheels. A ride height of the suspension is generally factory selected, and golf cart manufacturers frequently tune the suspension for road or golf course conditions. Thus, the factory ride height of many golf carts is lower than preferred by some golf carts users.

To increase the golf cart's ride height, a lift kit may be added to supplement or replace the factory suspension. Increasing ride height by installing lift kits can have drawbacks. For example, after installation, certain users may have difficulty getting into the golf cart due to the increased ride height.

BRIEF DESCRIPTION OF THE INVENTION

Aspects and advantages of the invention will be set forth in part in the following description, or may be apparent from the description, or may be learned through practice of the invention.

In an example embodiment, a side rail kit for a golf cart includes a frame bracket mountable to a frame of the golf cart. The frame bracket includes an elongated member that extends between a first end portion and a second end portion along a longitudinal direction. A pair of step brackets are mountable to the frame bracket. The step brackets extend from the frame member when the step brackets are mounted to the frame bracket. A distal end portion of each of the step brackets is spaced from the frame bracket along a lateral direction when the step brackets are mounted to the frame bracket. The lateral direction is perpendicular to the longitudinal direction. A step rail is mountable to the step brackets. The step rail includes an elongated member that extends between a first end portion and a second end portion along the longitudinal direction.

In a first example aspect, the elongated member of the step rail may be oriented generally parallel to the elongated member of the frame bracket when the step brackets are mounted to the frame bracket and the step rail is mounted to the step brackets.

In a second example aspect, the side rail kit may include a plurality of U-bolts configured for mounting the frame bracket to the frame of the golf cart.

In a third example aspect, the frame bracket may include a pair of step posts extending from the elongated member of the frame bracket along the lateral direction. Each of the step brackets may be mountable to the frame bracket at a respective one of the step posts of the frame member.

In a fourth example aspect, each of the step brackets may define a slot. Each of the step brackets may be mountable to the respective one of the step posts of the frame member with a pair of bolts that extend through the respective one of the step posts and the slot of the step brackets.

In a fifth example aspect, the frame bracket may include an angled post extending from the elongated member of the frame bracket at the first end portion of the elongated member of the frame bracket. The angled post may be oriented at an angle $\alpha$ with respect to the elongated member of the frame bracket. The angle $\alpha$ may be no less than one hundred and twenty degrees and no greater than one hundred and fifty degrees.

In a sixth example aspect, the side rail kit may include a U-bolt configured for mounting the frame bracket to the frame of the golf cart. The angled post may include a mounting plate. The U-bolt may be mountable on the frame of the golf cart such that the frame of the golf cart is disposed between legs of the U-bolt and the legs of the U-bolt extend through the mounting plate of the angled post.

In a seventh example aspect, the side rail kit may include a U-bolt configured for mounting the frame bracket to the frame of the golf cart. The frame bracket may include a mounting plate positioned proximate the second end portion of the elongated member of the frame bracket. The U-bolt may be mountable on the frame of the golf cart such that the frame of the golf cart is disposed between legs of the U-bolt and the legs of the U-bolt extend through the mounting plate of the frame bracket.

In an eighth example aspect, the frame bracket may include a stub post extending from the elongated member of the frame bracket along a transverse direction at the first end portion of the elongated member of the frame bracket. The transverse direction may be perpendicular to the longitudinal and lateral directions.

In a ninth example aspect, the stub post may define a curved recess at a distal end portion of the stub post. The curved recess may be configured for receipt of a rail of the frame of the golf cart.

In a tenth example aspect, the side rail kit may include a U-bolt configured for mounting the frame bracket to the frame of the golf cart. The U-bolt may be mountable on the frame of the golf cart such that the frame of the golf cart and the stub post are disposed between legs of the U-bolt and the legs of the U-bolt extend through the frame bracket.

In an eleventh example aspect, the step brackets may be fixed to the frame bracket.

In a twelfth example aspect, the side rail kit may include a plurality of mounting tabs and a plurality of bolts. The mounting tabs may be positionable on the frame of the golf cart. The bolts may be configured for mounting the frame bracket to the frame of the golf cart. Each of the bolts may be configured to extend through the elongated member of the frame bracket into a respective mounting tab when the mounting tabs are positioned on the frame of the golf cart.

In a thirteenth example aspect, the side rail kit may include a plurality of bolts configured for mounting the step brackets to the frame bracket and/or for mounting the step rail to the step brackets.

In a fourteenth example aspect, the step rail may include a step plate between the first and second end portions of the elongated member of the step rail along the longitudinal direction.

In a fifteenth example aspect, the step plate may include a curved member and a perforated panel. The curved member may be mounted to the elongated member of the step rail. The perforated panel may be disposed between the curved member and the elongated member of the step rail.

In a sixteenth example aspect, the step rail may include a pair of mounting posts. Each of the mounting posts may be mounted to the elongated member of the step rail proximate a respective end of the curved member.

In a seventeenth example aspect, the elongated member of the frame bracket and the elongated member of the step rail may be constructed of metal.

The example aspects recited above may be combined with one or more of the other example aspects recited above in certain embodiments. For instance, a subset of the all of the seventeen example aspects recited above may be combined with one another in some embodiments. As another example, any suitable combination of two, three, four, five, or more of the seventeen example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
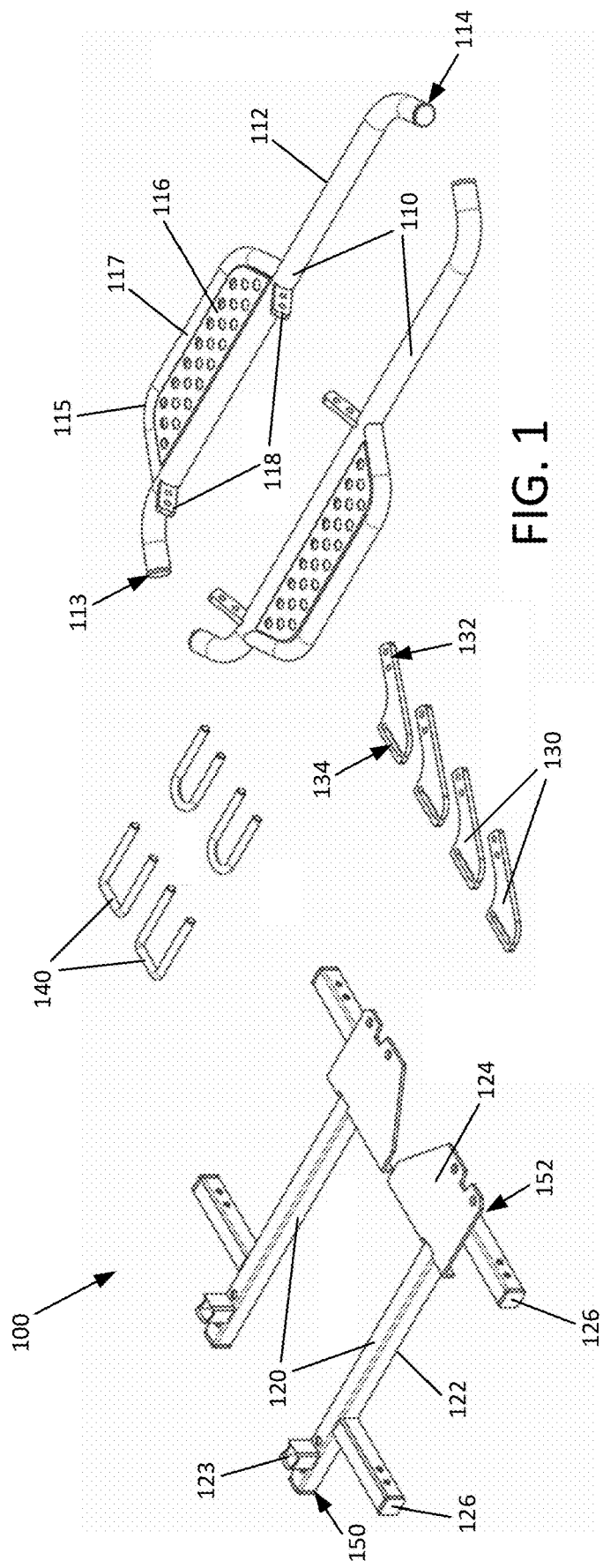
FIG. 1 is a perspective view of a side rail kit for a golf cart according to a first example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As may be seen in FIGS. 1 through 10, the present subject matter is directed to side rail kits for golf carts. It will be understood that the golf cart side rail kits described herein may be used in or with any suitable golf cart. For example, the side rail kits described herein may be used in or with a Club Car® DS golf cart, an E-Z-GO® TXT® golf cart, a Club Car® Precedent® golf cart, or a Yamaha® G29 golf cart. Thus, example side rail kits are described in greater detail below in the context of and are illustrated as suitable for use in such golf carts. However, the present subject matter is not limited to any particular golf car model, style or arrangement. The use of the term "about" when used in conjunction with a numerical value is intended to refer to within twenty five percent (25%) of the stated numerical value unless otherwise stated.

Figure 2:
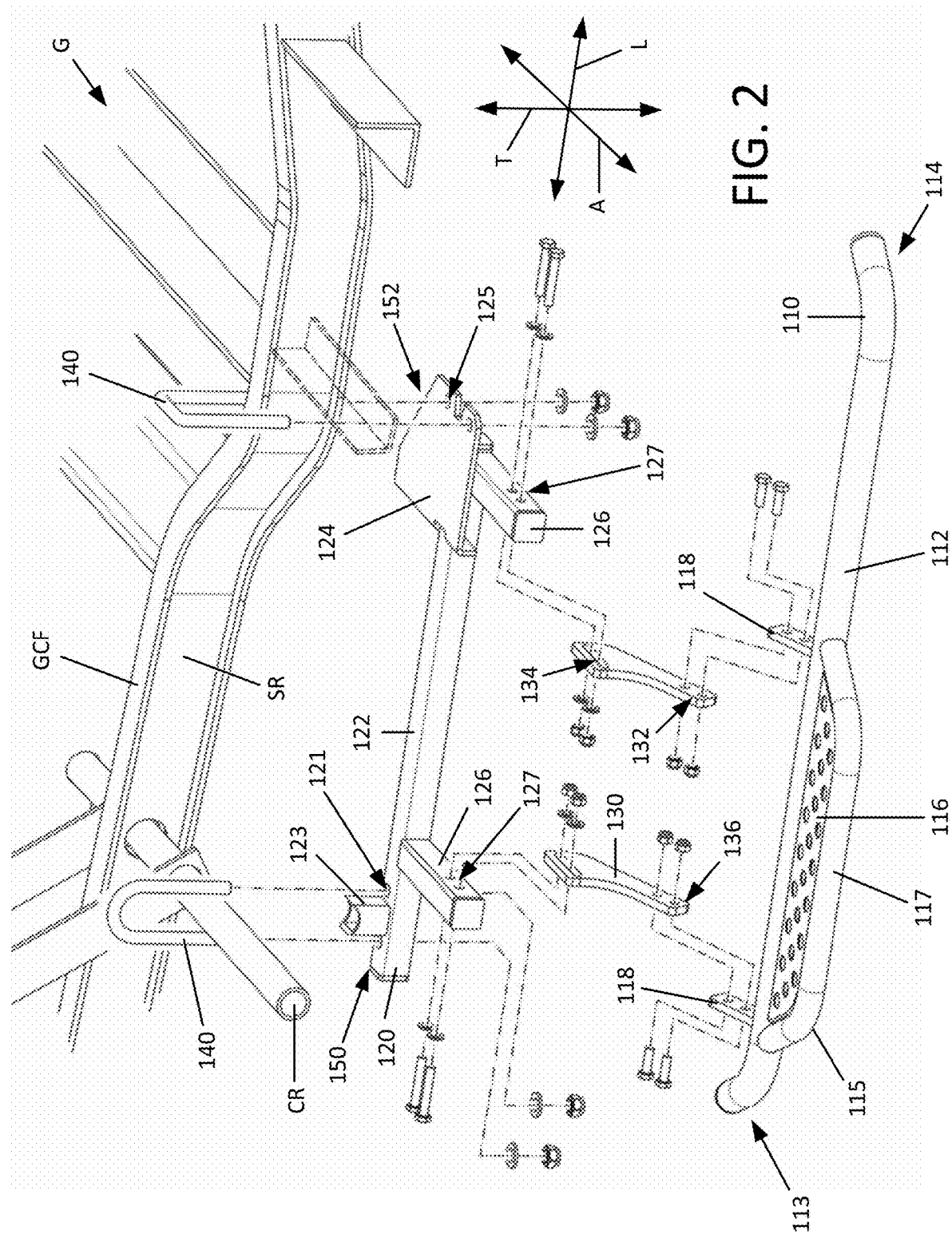
FIG. 2 is an exploded, perspective view of the example side rail kit of FIG. 1 during mounting to a frame of the golf cart.

FIG. 1 is a perspective view of a side rail kit 100 for a golf cart G (FIG. 2) according to an example embodiment of the present subject matter. FIG. 2 is a perspective view of side rail kit 100. Golf cart G may be a Club Car® DS golf cart, and components of golf cart G may be factory or stock components that side rail kit 100 cooperates with to provide a step rail or nerf bar on golf cart G. As may be seen in FIG. 2, golf cart G includes a frame GCF with a side rail SR and a cross rail CR. Thus, frame GCF, side rail SR, and cross rail CR may be factory or stock components of golf cart G and are not components of side rail kit 100. As discussed in greater detail below, side rail kit 100 may be mounted to or on the existing components of golf cart G, including frame GCF, to provide a step rail or nerf bar on golf cart G. As shown in FIG. 2, e.g., when mounted to golf cart, side rail kit 100 may define a longitudinal direction L, a lateral direction A, and a transverse direction T that are mutually perpendicular and form an orthogonal direction system.

As may be seen in FIGS. 1 and 2, side rail kit 100 includes a pair of step rails 110, a pair of frame brackets 120, and a plurality of step brackets 130. Frame brackets 120 are mountable to frame GCF of golf cart G. For example, as shown in FIG. 2, the mounting of one of frame brackets 120 (e.g., the left-side frame bracket 120) to frame GCF of golf cart G is shown. The other of frame brackets 120 (e.g., the right-side frame bracket 120) may be mounted to frame GCF of golf cart G in the same or similar manner. Thus, mounting of frame brackets 120 is described in greater detail below in the context of the one of frame brackets 120 shown in FIG. 2, and additional description of the mounting of the other of frame brackets 120 is omitted for the sake of brevity. As shown in FIG. 2, side rail kit 100 may also include a plurality of bolts (not labeled) configured for mounting step brackets 130 to frame bracket 120 and/or for mounting step rail 110 to step brackets 130.

Step brackets 130 are mountable to frame brackets 120. For instance, a respective two of step brackets 130 may be mounted to each frame bracket 120. Step rails 110 are mountable to step brackets 130. Thus, e.g., frame brackets 120 and step brackets 130 may collectively form a support assembly for mounting step rails 110 of side rail kit 100 to frame GCF of golf cart G. Moreover, each step rail 110 may be mounted to frame GCF of golf cart G on a respective frame bracket 120 and step brackets 130 mounted to such frame bracket 120, as discussed in greater detail below.

With reference to FIG. 2, frame bracket 120 may include an elongated member 122. Elongated member 122 of frame bracket 120 may extend between a first end portion 150 and a second end portion 152, e.g., along the longitudinal direction L. Elongated member 122 of frame bracket 120 may be constructed of metal, such as a tubular or hollow metal body.

As noted above, frame bracket 120 may be mounted to frame GCF of golf cart G, e.g., side rail SR and/or cross rail CR of frame GCF. For example, side rail kit 100 may include a plurality of U-bolts 140 for mounting frame bracket 120 to frame GCF of golf cart G, as described in greater detail below. Utilizing U-bolts 140, frame bracket 120 may be mounted to frame GCF of golf cart G without drilling or otherwise modifying frame GCF of golf cart G.

Frame bracket 120 may include a mounting plate 124 positioned proximate second end portion 152 of elongated member 122. For example, mounting plate 124 may be welded to elongated member 122 at or adjacent second end portion 152 of elongated member 122. One of U-bolts 140 (e.g., one of U-bolts with a flat cross-member) is mountable on frame GCF. In particular, side rail SR of frame GCF may be disposed between legs of the one of U-bolts 140, and the legs of the U-bolt 140 may also extend through mounting plate 124 of frame bracket 120. Nuts may be threaded onto the U-bolt 140, e.g., against mounting plate 124 opposite side rail SR of frame GCF, in order to fasten frame bracket 120 to frame GCF of golf cart G.

Frame bracket 120 may also include a stub post 123 positioned proximate first end portion 150 of elongated member 122. For example, stub post 123 may be welded to elongated member 122 at or adjacent first end portion 150 of elongated member 122. Thus, e.g., stub post 123 may be position opposite mounting plate 124 on elongated member 122. Stub post 123 extends, e.g., upwardly, from elongated member 122 of frame bracket 120, e.g., along the transverse direction T. One of U-bolts 140 (e.g., one of U-bolts with a curved cross-member) is mountable on frame GCF. In particular, cross rail CR of frame GCF and stub post 123 may be disposed between legs of the one of U-bolts 140, and the legs of the U-bolt 140 may also extend through frame bracket 120, e.g., elongated member 122. Nuts may be threaded onto the U-bolt 140, e.g., against elongated member 122 opposite cross rail CR of frame GCF, in order to fasten the frame bracket 120 to frame GCF of golf cart G. Stub post 123 may define a curved recess at a distal end portion of stub post 123. The curved recess of stub post 123 is configured for receipt of cross rail CR of frame GCF. Thus, e.g., the shape of the curved recess of stub post 123 may complement the curvature of cross rail CR of frame GCF.

As noted above, step brackets 130 may be mounted to frame brackets 120. For instance, as shown in FIG. 2, when frame bracket 120 is mounted to frame GCF of golf cart G and step brackets 130 are mounted to frame bracket 120, step brackets 130 may extend, e.g., outwardly, from frame member 120. Moreover, a distal end portion 136 of each step bracket 130 may be spaced from frame bracket 120 along the lateral direction A.

As shown in FIG. 2, frame bracket 120 may include a pair of step posts 126 that extend from elongated member 122 of frame bracket 120, e.g., along the lateral direction A. Each of step brackets 130 may be mountable to frame bracket 120 at a respective step post 126. Moreover, each of step brackets 130 may also define a slot 134. Each of step brackets 130 may be mountable to the respective step post 126 with a pair of bolts (not labeled) that extend through the step post 126 and the slot 134 of the step bracket 130.

Step rail 110 is mountable to step brackets 130. Step rail 110 may include an elongated member 112. Elongated member 112 of step rail 110 may extend between a first end portion 113 and a second end portion 114, e.g., along the longitudinal direction. Elongated member 112 of step rail 110 may be oriented generally parallel (e.g., within fifteen degrees (15°) of parallel) to elongated member 122 of frame bracket 120 when step brackets 130 are mounted to frame bracket 110 and step rail 110 is mounted to step brackets 130. Slot 134 of step brackets 130 may be configured to assist with mounting of step rail 110 in a suitable orientation, e.g., by allowing relative movement along the lateral direction A between first and second end portions 113, 114 of elongated member 112. Elongated member 112 of step rail 110 may be constructed of metal, such as a tubular or hollow metal body.

Step rail 110 may include a step plate 115. Step plate 115 may be positioned between first and second end portions 113, 114 of elongated member 112 of step rail 110, e.g., along the longitudinal direction L. Step plate 115 may include a perforated panel 116 and a curved member 117. Curved member 117 may be mounted (e.g., welded) to elongated member 112 of step rail 110. Perforated panel 116 may be disposed between curved member 117 and elongated member 112 of step rail 110. As an example, perforated panel 116 may be an expanded metal panel, a perforated sheet metal panel, etc. Step rail 110 may further include a pair of mounting posts 118. Each mounting post 118 may be mounted to elongated member 112 of step rail 110 proximate a respective end of curved member 117. Each mounting post 118 may be also positioned opposite the respective end of curved member 117, e.g., along the lateral direction A.

Using frame bracket 120 and step brackets 130, step rail 110 may be secured to frame GCF of golf cart G. For instance, frame bracket 120 may be mounted to frame GCF of golf cart G, e.g., using U-bolts 140, as described above. In addition, step brackets 130 may be mounted to frame bracket 120, e.g., using suitable bolts (not labeled). With frame bracket 120 and step brackets 130 mounted in such a manner, step rail 110 may be securely mounted to frame GCF of golf cart G via frame bracket 120 and step brackets 130. In particular, step rail 110 may be fastened to step brackets 130. For instance, each mounting post 118 may be mountable to a respective step bracket 130 with a pair of bolts (not labeled) that extend through the mounting post 118 and holes 132 in the step bracket 130 at the distal end portion 136 of the step bracket 130.

As may be seen from the above, step rail kit 100 includes features for securely mounting step rail 110 to frame GCF of golf cart G. In particular, side rail kit 100 may be configured to mount to or on frame GCF of golf cart G in order to provide step rail 110 on golf cart G. Moreover, side rail kit 100 may be mounted to or on frame GCF of golf cart G without drilling or otherwise modifying frame GCF of golf cart G in order to provide step rail 110 on golf cart G. This advantageous over known step rail accessories that require drilling or otherwise modifying frame GCF or other components of golf cart G.

Figure 3:
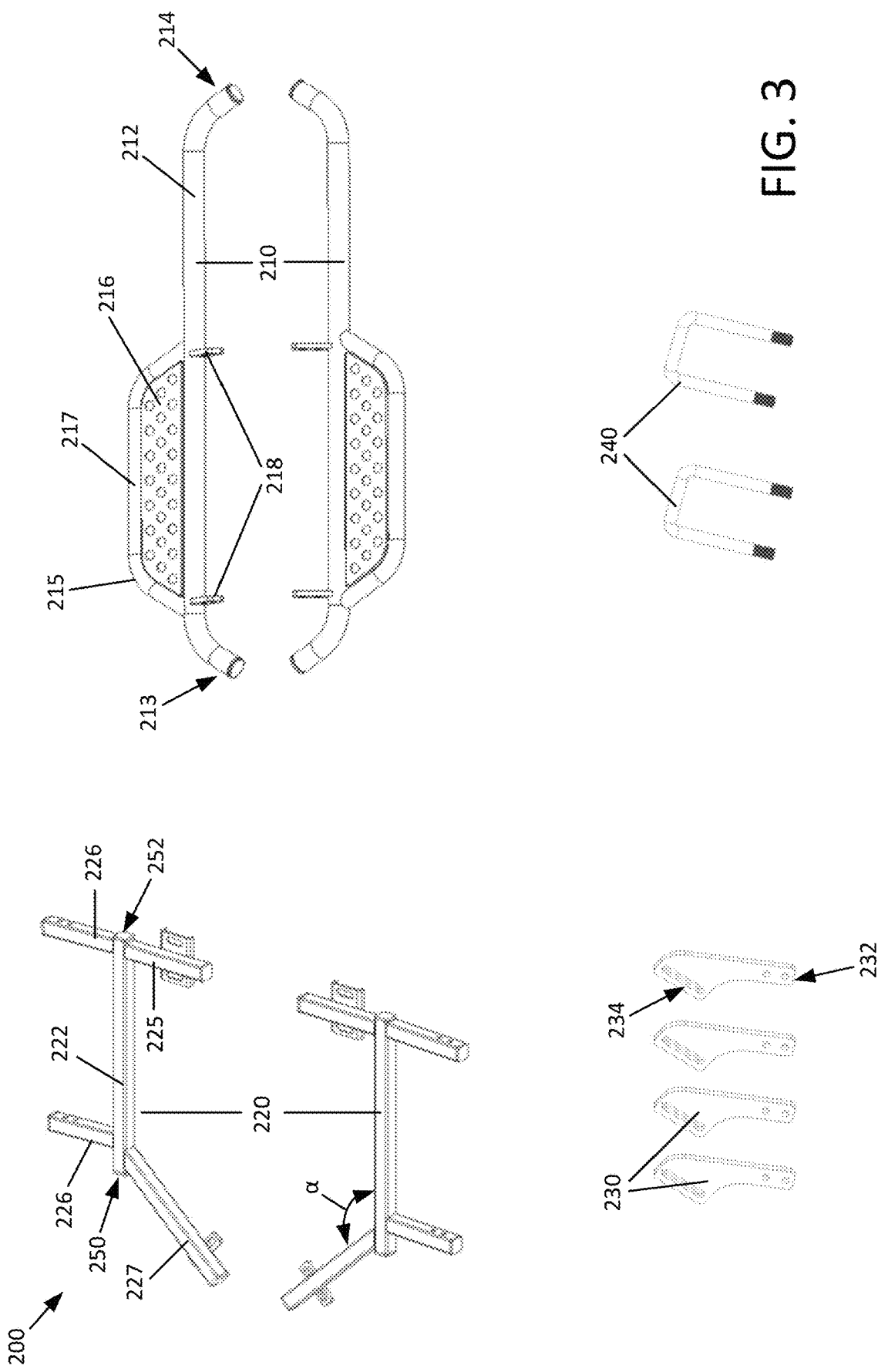
FIG. 3 is a perspective view of a side rail kit for a golf cart according to a second example embodiment of the present subject matter.
Figure 4:
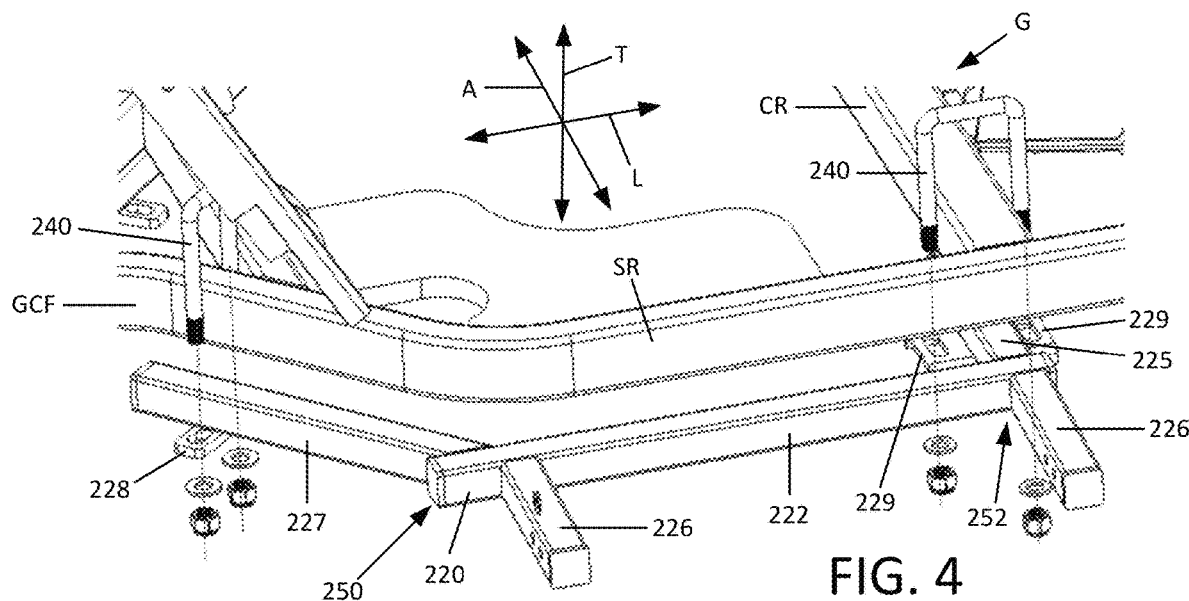
FIGS. 4 and 5 are exploded, perspective views of the example side rail kit of FIG. 3 during mounting to a frame of the golf cart.

FIG. 3 is a perspective view of a side rail kit 200 for golf cart G (FIGS. 3 and 4) according to another example embodiment of the present subject matter. FIGS. 3 and 4 are perspective views of side rail kit 200 being mounted to golf cart G. Golf cart G may be a Yamaha® G29 golf cart, and components of golf cart G may be factory or stock components that side rail kit 200 cooperates with to provide a step rail or nerf bar on golf cart G. As may be seen in FIGS. 3 and 4, golf cart G includes a frame GCF with a side rail SR and a cross rail CR. Thus, frame GCF, side rail SR, and cross rail CR may be factory or stock components of golf cart G and are not components of side rail kit 200. As discussed in greater detail below, side rail kit 200 may be mounted to or on the existing components of golf cart G, including frame GCF, to provide a step rail or nerf bar on golf cart G. As shown in FIGS. 3 and 4, e.g., when mounted to golf cart, side rail kit 200 may define the longitudinal direction L, the lateral direction A, and the transverse direction T that are mutually perpendicular and form an orthogonal direction system.

Figure 5:
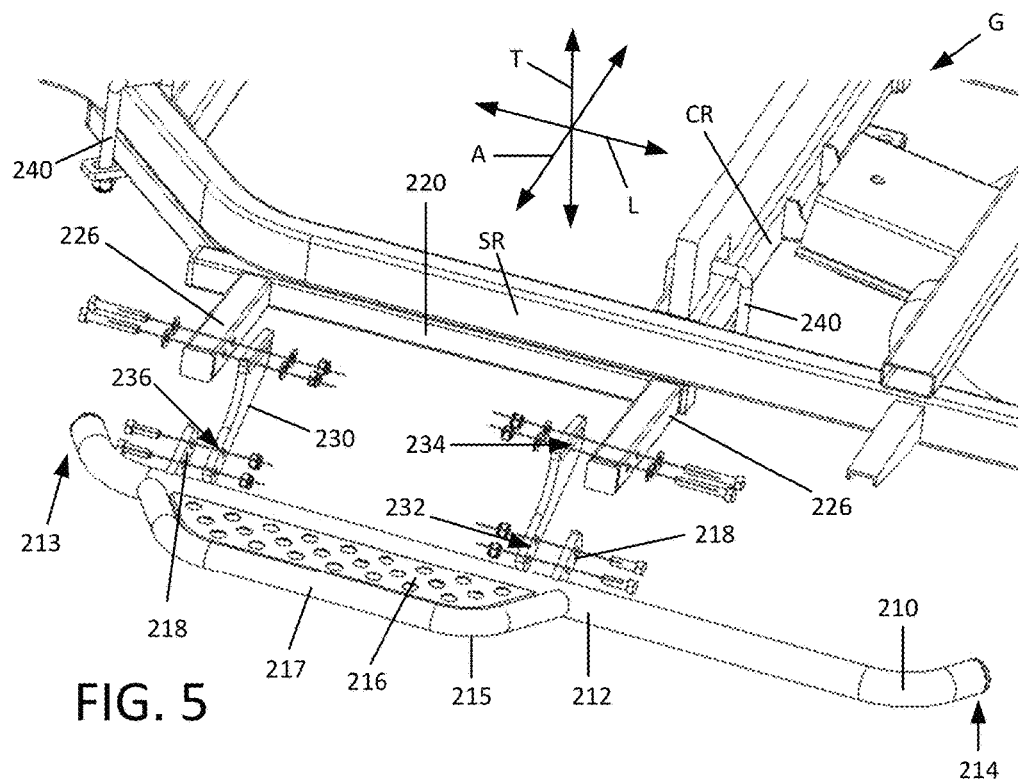

As may be seen in FIGS. 3 through 5, side rail kit 200 includes a pair of step rails 210, a pair of frame brackets 220, and a plurality of step brackets 230. Frame brackets 220 are mountable to frame GCF of golf cart G. For example, as shown in FIGS. 4 and 5, the mounting of one of frame brackets 220 (e.g., the left-side frame bracket 220) to frame GCF of golf cart G is shown. The other of frame brackets 220 (e.g., the right-side frame bracket 220) may be mounted to frame GCF of golf cart G in the same or similar manner. Thus, mounting of frame brackets 220 is described in greater detail below in the context of the one of frame brackets 220 shown in FIGS. 4 and 5, and additional description of the mounting of the other of frame brackets 220 is omitted for the sake of brevity. As shown in FIGS. 4 and 5, side rail kit 200 may also include a plurality of bolts (not labeled) configured for mounting step brackets 230 to frame bracket 220 and/or for mounting step rail 210 to step brackets 230.

Step brackets 230 are mountable frame brackets 220. For instance, a respective two of step brackets 230 may be mounted to each frame bracket 220. Step rails 210 are mountable to step brackets 230. Thus, e.g., frame brackets 220 and step brackets 230 may collectively form a support assembly for mounting step rails 210 of side rail kit 200 to frame GCF of golf cart G. Moreover, each step rail 210 may be mounted to frame GCF of golf cart G on a respective frame bracket 220 and step brackets 230 mounted to such frame bracket 220, as discussed in greater detail below.

With reference to FIGS. 4 and 5, frame bracket 220 may include an elongated member 222. Elongated member 222 of frame bracket 220 may extend between a first end portion 250 and a second end portion 252, e.g., along the longitudinal direction L. Elongated member 222 of frame bracket 220 may be constructed of metal, such as a tubular or hollow metal body.

As noted above, frame bracket 220 may be mounted to frame GCF of golf cart G, e.g., side rail SR and/or cross rail CR of frame GCF. For example, side rail kit 200 may include a plurality of U-bolts 240 for mounting frame bracket 220 to frame GCF of golf cart G, as described in greater detail below. Utilizing U-bolts 240, frame bracket 220 may be mounted to frame GCF of golf cart G without drilling or otherwise modifying frame GCF of golf cart G.

Frame bracket 220 may include a cross post 225. Cross post 225 may extend from elongated member 222 of frame bracket 220, e.g., along the lateral direction L, at second end portion 252 of elongated member 222 of frame bracket 220. Cross post 225 may be positioned against and/or extend parallel to cross rail CR of frame GCF. Cross post 225 may include a mounting plate 229, e.g., at a distal end portion of cross post 225. For example, mounting plate 229 may be welded to cross post 225. One of U-bolts 240 is mountable on frame GCF to mount cross post 225 to cross rail CR. In particular, cross post 225 of frame GCF may be disposed between legs of the one of U-bolts 240, and the legs of the U-bolt 240 may also extend through mounting plate 229 of cross post 225. Nuts may be threaded onto the U-bolt 240, e.g., against mounting plate 229 in order to fasten the frame bracket 220 to frame GCF of golf cart G.

Frame bracket 220 may also include an angled post 227. Angled post 227 may extend from elongated member 222 of frame bracket 220 at first end portion 250 of elongated member 222 of frame bracket 220. Angled post 227 may be oriented at an angle α (FIG. 3) with respect to elongated member 222 of frame bracket 220, e.g., in a plane that is perpendicular to the transverse direction T. The angle α may be no less than one hundred and twenty degrees (120°) and no greater than one hundred and fifty degrees (150°). For example, the angle α may be about one hundred and thirty-five degrees (135°). Such orientation of elongated member 222 and angled post 227 may advantageously allow elongated member 222 to be positioned against and/or extend parallel to a first portion of side rail SR of frame GCF while also allowing angled post 227 to be positioned against and/or extend parallel to a second portion of side rail SR of frame GCF. In particular, the orientation of elongated member 222 and angled post 227 may complement the shape of side rail SR of frame GCF.

Angled post 227 may include a mounting plate 228, e.g., at a distal end portion of angled post 227. For example, mounting plate 228 may be welded to angled post 227. One of U-bolts 240 is mountable on frame GCF. In particular, side rail SR of frame GCF may be disposed between legs of the one of U-bolts 240, and the legs of the U-bolt 240 may also extend through mounting plate 228 of angled post 227. Nuts may be threaded onto the U-bolt 240, e.g., against mounting plate 228 in order to fasten the frame bracket 220 to frame GCF of golf cart G.

As noted above, step brackets 230 may be mounted to frame brackets 220. For instance, as shown in FIG. 5, when frame bracket 220 is mounted to frame GCF of golf cart G and step brackets 230 are mounted to frame bracket 220, step brackets 230 may extend, e.g., outwardly, from frame member 220. Moreover, a distal end portion 236 of each step bracket 230 may be spaced from frame bracket 220 along the lateral direction A.

As shown in FIG. 5, frame bracket 220 may include a pair of step posts 226 that extend from elongated member 222 of frame bracket 220, e.g., along the lateral direction A. Each of step brackets 230 may be mountable to frame bracket 220 at a respective step post 226. Moreover, each of step brackets 230 may also define a slot 234. Each of step brackets 230 may be mountable to the respective step post 226 with a pair of bolts (not labeled) that extend through the step post 226 and the slot 234 of the step bracket 230.

Step rail 210 is mountable to step brackets 230. Step rail 210 may include an elongated member 212. Elongated member 212 of step rail 210 may extend between a first end portion 213 and a second end portion 214, e.g., along the longitudinal direction L. Elongated member 212 of step rail 210 may be oriented generally parallel (e.g., within fifteen degrees (15°) of parallel) to elongated member 222 of frame bracket 220 when step brackets 230 are mounted to frame bracket 210 and step rail 210 is mounted to step brackets 230. Slot 234 of step brackets 230 may be configured to assist with mounting of step rail 210 in a suitable orientation, e.g., by allowing relative movement along the lateral direction A between first and second end portions 213, 214 of elongated member 212. Elongated member 212 of step rail 210 may be constructed of metal, such as a tubular or hollow metal body.

Step rail 210 may include a step plate 215. Step plate 215 may be positioned between first and second end portions 213, 214 of elongated member 212 of step rail 210, e.g., along the longitudinal direction L. Step plate 215 may include a perforated panel 216 and a curved member 217. Curved member 217 may be mounted (e.g., welded) to elongated member 212 of step rail 210. Perforated panel 216 may be disposed between curved member 217 and elongated member 212 of step rail 210. As an example, perforated panel 216 may be an expanded metal panel, a perforated sheet metal panel, etc. Step rail 210 may further include a pair of mounting posts 218. Each mounting post 218 may be mounted to elongated member 212 of step rail 210 proximate a respective end of curved member 217. Each mounting post 218 may be also be positioned opposite the respective end of curved member 217, e.g., along the lateral direction A.

Using frame bracket 220 and step brackets 230, step rail 210 may be secured to frame GCF of golf cart G. For instance, frame bracket 220 may be mounted to frame GCF of golf cart G, e.g., using U-bolts 240, as described above. In addition, step brackets 230 may be mounted to frame bracket 220, e.g., using suitable bolts (not labeled). With frame bracket 220 and step brackets 230 mounted in such a manner, step rail 210 may be securely mounted to frame GCF of golf cart G via frame bracket 220 and step brackets 230. In particular, step rail 210 may be fastened to step brackets 230. For instance, each mounting post 218 may be mountable to a respective step bracket 230 with a pair of bolts (not labeled) that extend through the mounting post 218 and holes 232 in the step bracket 230 at the distal end portion 236 of the step bracket 230.

As may be seen from the above, step rail kit 200 includes features for securely mounting step rail 210 to frame GCF of golf cart G. In particular, side rail kit 200 may be configured to mount to or on frame GCF of golf cart G in order to provide step rail 210 on golf cart G. For instance, side rail kit 200 may be mounted to or on frame GCF of golf cart G without drilling or otherwise modifying frame GCF of golf cart G in order to provide step rail 210 on golf cart G. This advantageous over known step rail accessories that require drilling or otherwise modifying frame GCF or other components of golf cart G.

Figure 6:
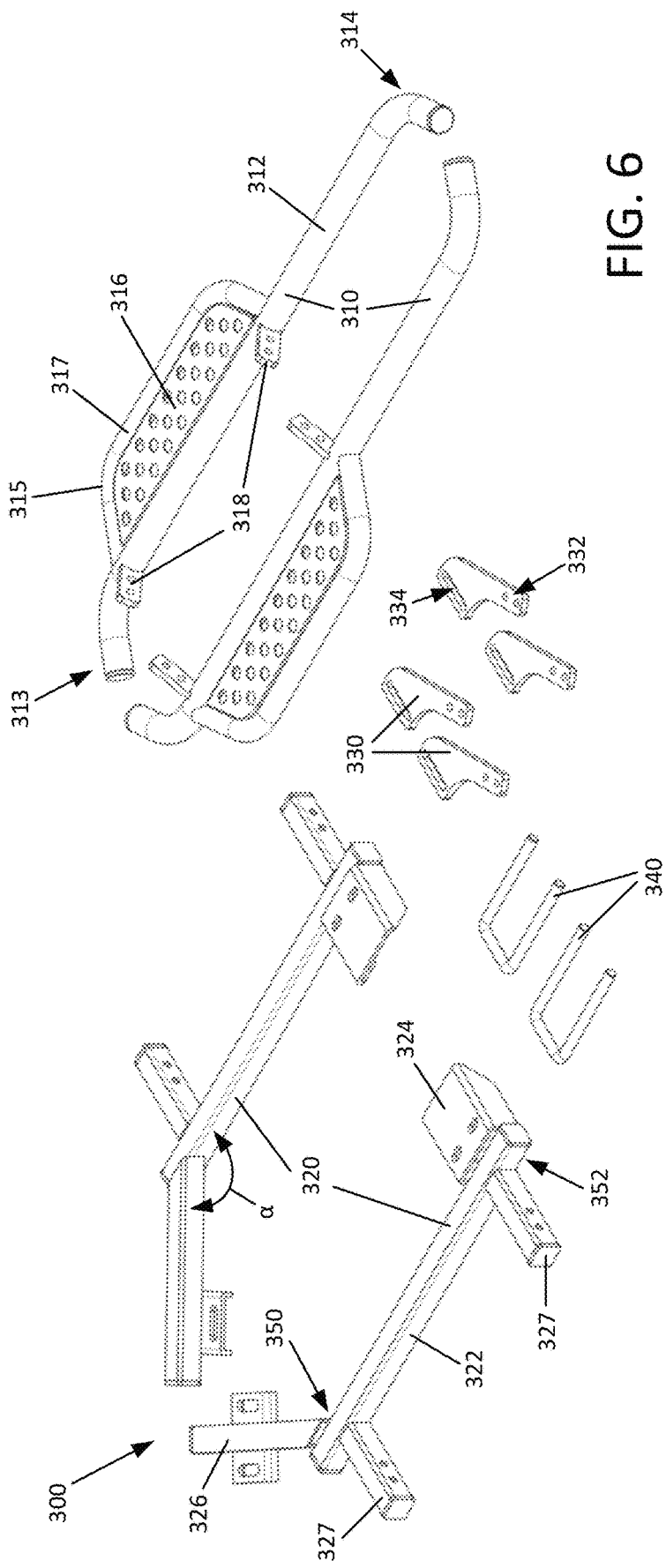
FIG. 6 is a perspective view of a side rail kit for a golf cart according to a third example embodiment of the present subject matter.
Figure 7:
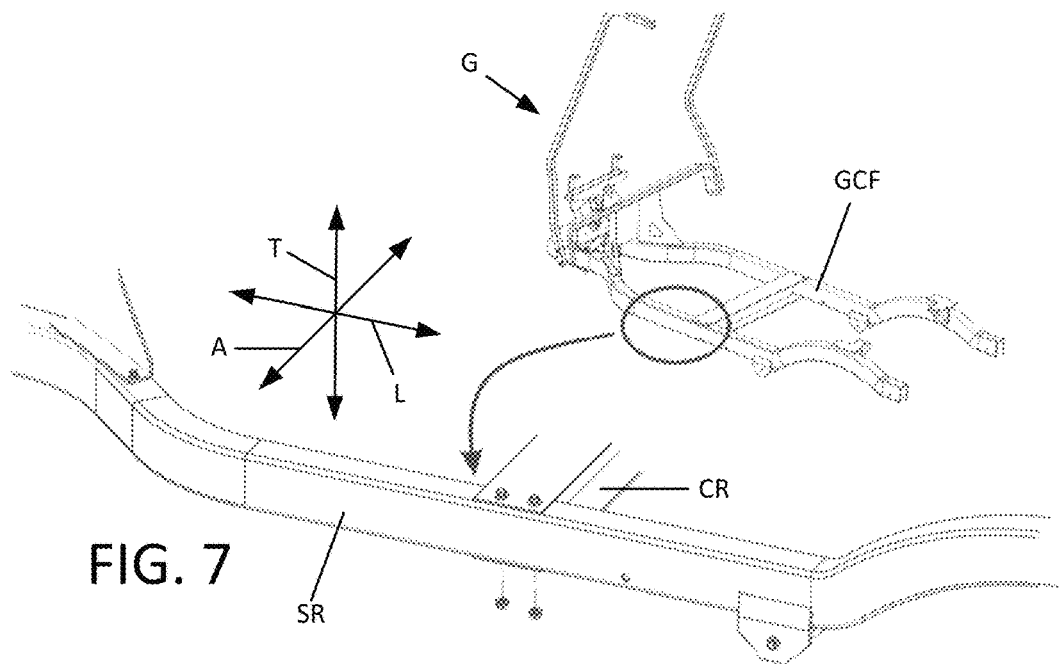
FIGS. 7 and 8 are exploded, perspective views of the example side rail kit of FIG. 6 during mounting to a frame of the golf cart.
Figure 8:
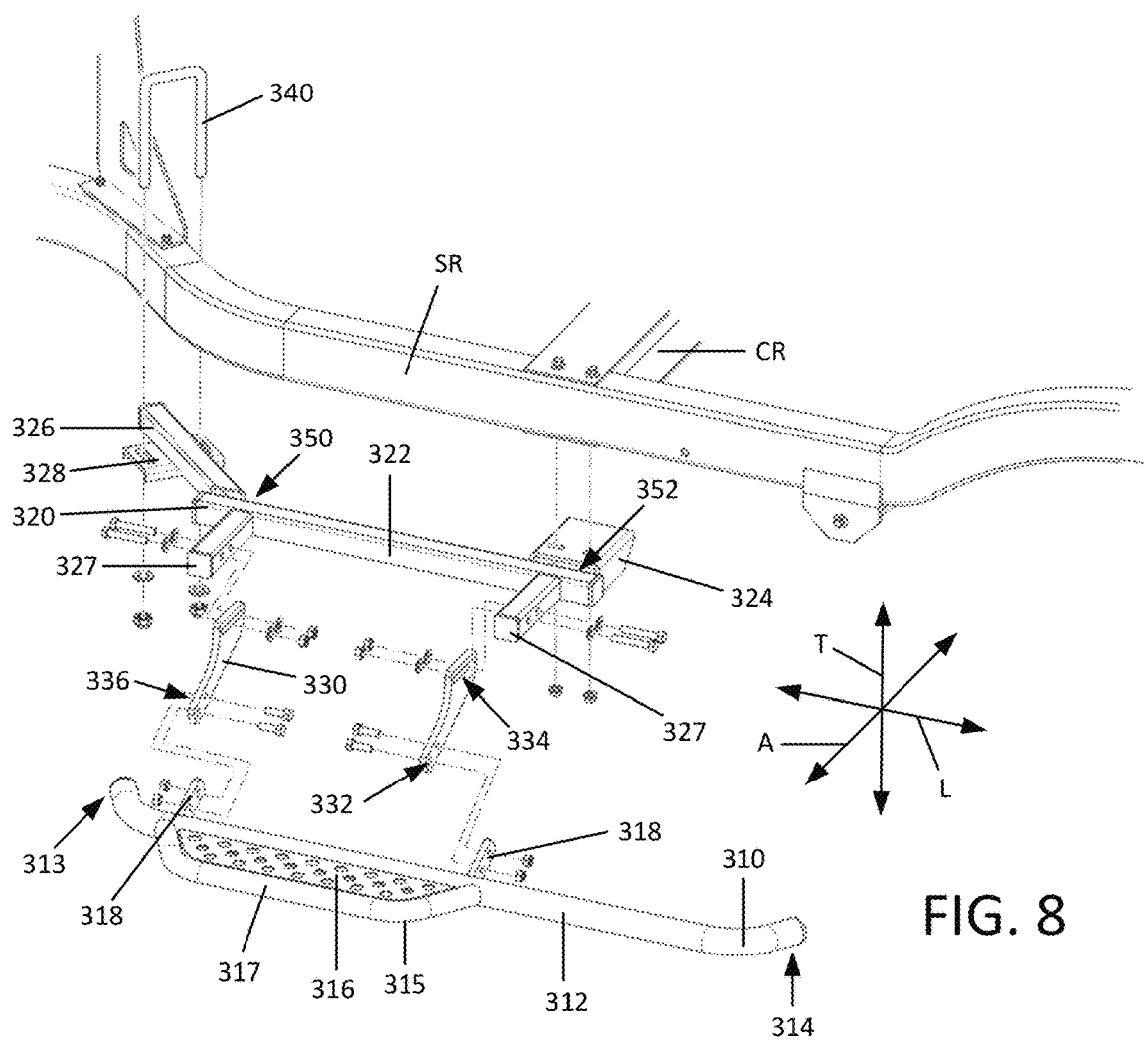

FIG. 6 is a perspective view of a side rail kit 300 for golf cart G (FIGS. 7 and 8) according to another example embodiment of the present subject matter. FIGS. 7 and 8 are perspective views of side rail kit 300 being mounted to golf cart G. Golf cart G may be a Club Car® Precedent® golf cart, and components of golf cart G may be factory or stock components that side rail kit 300 cooperates with to provide a step rail or nerf bar on golf cart G. As may be seen in FIGS. 7 and 8, golf cart G includes a frame GCF with a side rail SR and a cross rail CR. Thus, frame GCF, side rail SR, and cross rail CR may be factory or stock components of golf cart G and are not components of side rail kit 300. As discussed in greater detail below, side rail kit 300 may be mounted to or on the existing components of golf cart G, including frame GCF, to provide a step rail or nerf bar on golf cart G. As shown in FIGS. 7 and 8, e.g., when mounted to golf cart, side rail kit 300 may define the longitudinal direction L, the lateral direction A, and the transverse direction T that are mutually perpendicular and form an orthogonal direction system.

As may be seen in FIGS. 6 through 8, side rail kit 300 includes a pair of step rails 310, a pair of frame brackets 320, and a plurality of step brackets 330. Frame brackets 320 are mountable to frame GCF of golf cart G. For example, as shown in FIGS. 7 and 8, the mounting of one of frame brackets 320 (e.g., the left-side frame bracket 320) to frame GCF of golf cart G is shown. The other of frame brackets 320 (e.g., the right-side frame bracket 320) may be mounted to frame GCF of golf cart G in the same or similar manner. Thus, mounting of frame brackets 320 is described in greater detail below in the context of the one of frame brackets 320 shown in FIGS. 7 and 8, and additional description of the mounting of the other of frame brackets 320 is omitted for the sake of brevity. As shown in FIGS. 7 and 8, side rail kit 300 may also include a plurality of bolts (not labeled) configured for mounting step brackets 330 to frame bracket 320 and/or for mounting step rail 310 to step brackets 330.

Step brackets 330 are mountable frame brackets 320. For instance, a respective two of step brackets 330 may be mounted to each frame bracket 320. Step rails 310 are mountable to step brackets 330. Thus, e.g., frame brackets 320 and step brackets 330 may form collectively form a support assembly for mounting step rails 310 of side rail kit 300 to frame GCF of golf cart G. Moreover, each step rail 310 may be mounted to frame GCF of golf cart G on a respective frame bracket 320 and step brackets 330 mounted to such frame bracket 320, as discussed in greater detail below.

With reference to FIGS. 7 and 8, frame bracket 320 may include an elongated member 322. Elongated member 322 of frame bracket 320 may extend between a first end portion 350 and a second end portion 352, e.g., along the longitudinal direction L. Elongated member 322 of frame bracket 320 may be constructed of metal, such as a tubular or hollow metal body.

As noted above, frame bracket 320 may be mounted to frame GCF of golf cart G, e.g., side rail SR and/or cross rail CR of frame GCF. For example, side rail kit 300 may include a plurality of U-bolts 340 for mounting frame bracket 320 to frame GCF of golf cart G, as described in greater detail below. In addition, side rail kit 300 may utilize existing bolts of golf cart G to assist with mounting frame bracket 320 to frame GCF of golf cart G. Utilizing U-bolts 340 and/or existing bolts of golf cart G, frame bracket 320 may be mounted to frame GCF of golf cart G without drilling or otherwise modifying frame GCF of golf cart G.

Frame bracket 320 may include a mounting plate 324. Mounting plate 324 may be mounted to elongated member 322 of frame bracket 320 at second end portion 352 of elongated member 322 of frame bracket 320. Moreover, mounting plate 324 may extend from elongated member 322 of frame bracket 320, e.g., along the lateral direction L, at second end portion 352 of elongated member 322 of frame bracket 320. Mounting plate 324 may be positioned against and/or extend along cross rail CR of frame GCF. As shown in FIGS. 7 and 8, existing bolts of golf cart G, e.g., that fasten cross rail CR of frame GCF to side rail SR of frame GCF, may be utilized to secure mounting plate 324 to cross rail CR. In particular, the existing bolts of golf cart G, e.g., that fasten cross rail CR of frame GCF to side rail SR of frame GCF, may extend through mounting plate 324. Nuts may be threaded onto the existing bolts of golf cart G, e.g., against mounting plate 324 in order to fasten the frame bracket 320 to frame GCF of golf cart G.

Frame bracket 320 may also include an angled post 326. Angled post 326 may extend from elongated member 322 of frame bracket 320 at first end portion 350 of elongated member 322 of frame bracket 320. Angled post 326 may be oriented at an angle α (FIG. 6) with respect to elongated member 322 of frame bracket 320, e.g., in a plane that is perpendicular to the transverse direction T. The angle α may be no less than one hundred and twenty degrees (120°) and no greater than one hundred and fifty degrees (150°). For example, the angle α may be about one hundred and thirty-five degrees (135°). Such orientation of elongated member 322 and angled post 326 may advantageously allow elongated member 322 to be positioned against and/or extend parallel to a first portion of side rail SR of frame GCF while also allowing angled post 326 to be positioned against and/or extend parallel to a second portion of side rail SR of frame GCF. In particular, the orientation of elongated member 322 and angled post 326 may complement the shape of side rail SR of frame GCF.

Angled post 326 may include a mounting plate 328, e.g., at a distal end portion of angled post 326. For example, mounting plate 328 may be welded to angled post 326. One of U-bolts 340 is mountable on frame GCF. In particular, side rail SR of frame GCF may be disposed between legs of the one of U-bolts 340, and the legs of the U-bolt 340 may also extend through mounting plate 328 of angled post 326. Nuts may be threaded onto the U-bolt 340, e.g., against mounting plate 328 in order to fasten the frame bracket 320 to frame GCF of golf cart G.

As noted above, step brackets 330 may be mounted to frame brackets 320. For instance, as shown in FIG. 8, when frame bracket 320 is mounted to frame GCF of golf cart G and step brackets 330 are mounted to frame bracket 320, step brackets 330 may extend, e.g., outwardly, from frame member 320. Moreover, a distal end portion 336 of each step bracket 330 may be spaced from frame bracket 320 along the lateral direction A.

As shown in FIG. 8, frame bracket 320 may include a pair of step posts 327 that extend from elongated member 322 of frame bracket 320, e.g., along the lateral direction A. Each of step brackets 330 may be mountable to frame bracket 320 at a respective step post 327. Moreover, each of step brackets 330 may also define a slot 334. Each of step brackets 330 may be mountable to the respective step post 327 with a pair of bolts (not labeled) that extend through the step post 327 and the slot 334 of the step bracket 330.

Step rail 310 is mountable to step brackets 330. Step rail 310 may include an elongated member 312. Elongated member 312 of step rail 310 may extend between a first end portion 313 and a second end portion 314, e.g., along the longitudinal direction. Elongated member 312 of step rail 310 may be oriented generally parallel (e.g., within fifteen degrees (15°) of parallel) to elongated member 322 of frame bracket 320 when step brackets 330 are mounted to frame bracket 310 and step rail 310 is mounted to step brackets 330. Slot 334 of step brackets 330 may be configured to assist with mounting of step rail 310 in a suitable orientation, e.g., by allowing relative movement along the lateral direction A between first and second end portions 313, 314 of elongated member 312. Elongated member 312 of step rail 310 may be constructed of metal, such as a tubular or hollow metal body.

Step rail 310 may include a step plate 315. Step plate 315 may be positioned between first and second end portions 313, 314 of elongated member 312 of step rail 310, e.g., along the longitudinal direction L. Step plate 315 may include a perforated panel 316 and a curved member 317. Curved member 317 may be mounted (e.g., welded) to elongated member 312 of step rail 310. Perforated panel 316 may be disposed between curved member 317 and elongated member 312 of step rail 310. As an example, perforated panel 316 may be an expanded metal panel, a perforated sheet metal panel, etc. Step rail 310 may further include a pair of mounting posts 318. Each mounting post 318 may be mounted to elongated member 312 of step rail 310 proximate a respective end of curved member 317. Each mounting post 318 may be also be positioned opposite the respective end of curved member 317, e.g., along the lateral direction A.

Using frame bracket 320 and step brackets 330, step rail 310 may be secured to frame GCF of golf cart G. For instance, frame bracket 320 may be mounted to frame GCF of golf cart G, e.g., using U-bolts 340 and/or the existing bolts of golf cart G, as described above. In addition, step brackets 330 may be mounted to frame bracket 320, e.g., using suitable bolts (not labeled). With frame bracket 320 and step brackets 330 mounted in such a manner, step rail 310 may be securely mounted to frame GCF of golf cart G via frame bracket 320 and step brackets 330. In particular, step rail 310 may be fastened to step brackets 330. For instance, each mounting post 318 may be mountable to a respective step bracket 330 with a pair of bolts (not labeled) that extend through the mounting post 318 and holes 332 in the step bracket 330 at the distal end portion 336 of the step bracket 330.

As may be seen from the above, step rail kit 300 includes features for securely mounting step rail 310 to frame GCF of golf cart G. In particular, side rail kit 300 may be configured to mount to or on frame GCF of golf cart G in order to provide step rail 310 on golf cart G. For instance, side rail kit 300 may be mounted to or on frame GCF of golf cart G without drilling or otherwise modifying frame GCF of golf cart G in order to provide step rail 310 on golf cart G. This advantageous over known step rail accessories that require drilling or otherwise modifying frame GCF or other components of golf cart G.

Figure 9:
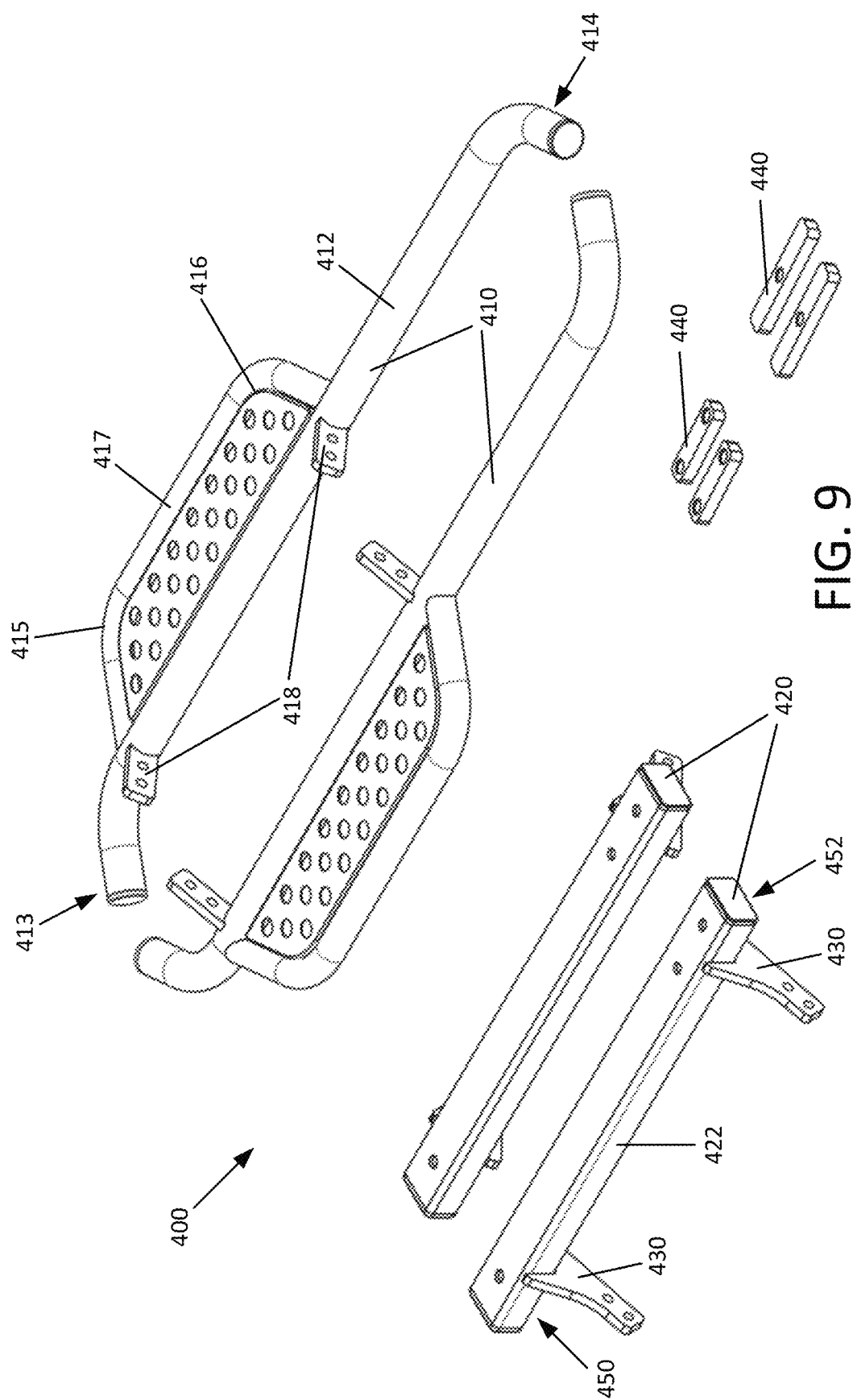
FIG. 9 is a perspective view of a side rail kit for a golf cart according to a fourth example embodiment of the present subject matter.
Figure 10:
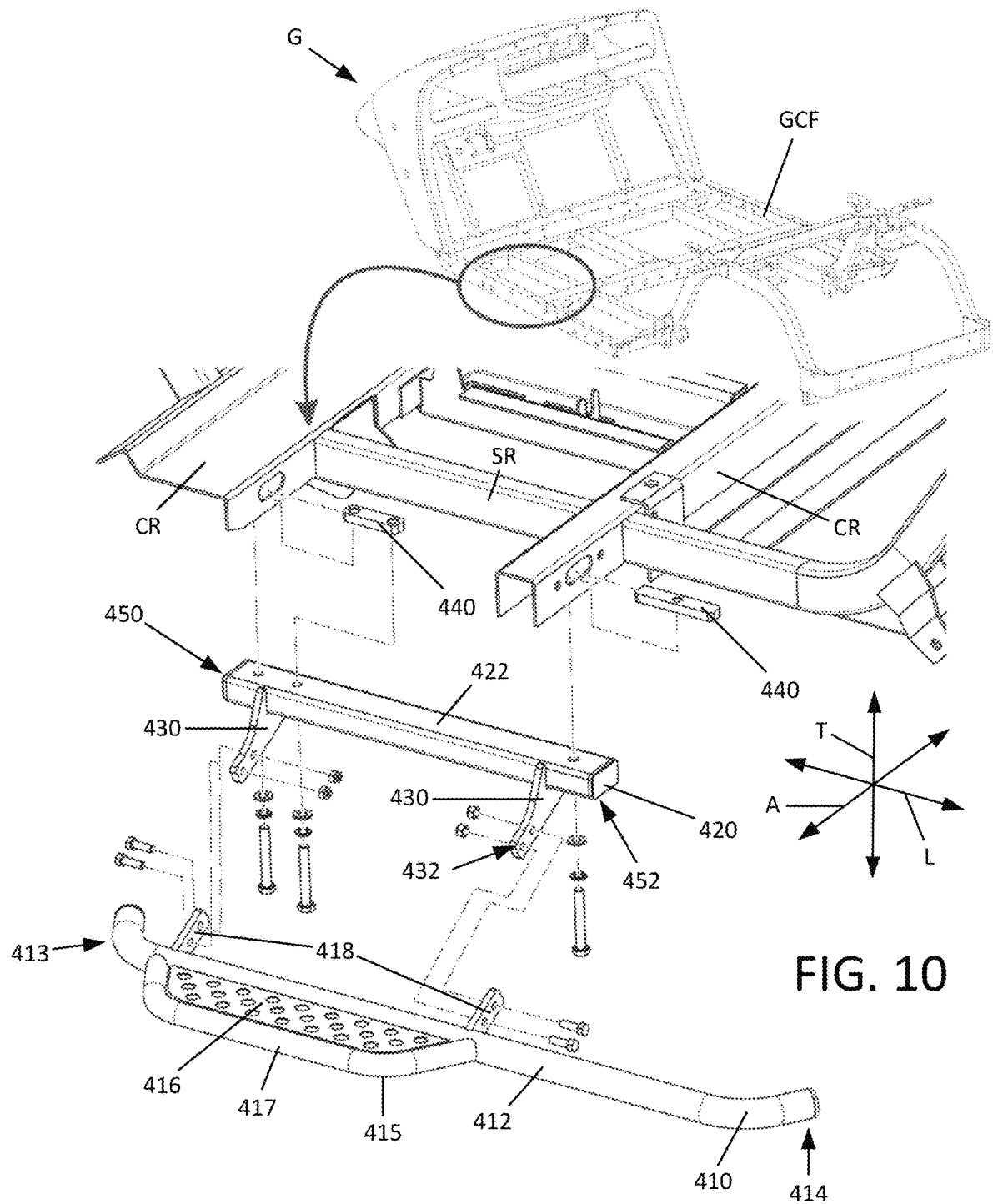
FIG. 10 is an exploded, perspective view of the example side rail kit of FIG. 9 during mounting to a frame of the golf cart.

FIG. 9 is a perspective view of a side rail kit 400 for golf cart G (FIG. 10) according to another example embodiment of the present subject matter. FIG. 10 is a perspective view of side rail kit 400 being mounted to golf cart G. Golf cart G may be an E-Z-GO® TXT® golf cart, and components of golf cart G may be factory or stock components that side rail kit 400 cooperates with to provide a step rail or nerf bar on golf cart G. As may be seen in FIG. 10, golf cart G includes a frame GCF with a side rail SR and a cross rail CR. Thus, frame GCF, side rail SR, and cross rail CR may be factory or stock components of golf cart G and are not components of side rail kit 400. As discussed in greater detail below, side rail kit 400 may be mounted to or on the existing components of golf cart G, including frame GCF, to provide a step rail or nerf bar on golf cart G. As shown in FIG. 10, e.g., when mounted to golf cart, side rail kit 400 may define the longitudinal direction L, the lateral direction A, and the transverse direction T that are mutually perpendicular and form an orthogonal direction system.

As may be seen in FIGS. 9 and 10, side rail kit 400 includes a pair of step rails 410, a pair of frame brackets 420, and a plurality of step brackets 430. Frame brackets 420 are mountable to frame GCF of golf cart G. For example, as shown in FIG. 10, the mounting of one of frame brackets 420 (e.g., the left-side frame bracket 420) to frame GCF of golf cart G is shown. The other of frame brackets 420 (e.g., the right-side frame bracket 420) may be mounted to frame GCF of golf cart G in the same or similar manner. Thus, mounting of frame brackets 420 is described in greater detail below in the context of the one of frame brackets 420 shown in FIG. 10, and additional description of the mounting of the other of frame brackets 420 is omitted for the sake of brevity. As shown in FIG. 10, side rail kit 400 may also include a plurality of bolts (not labeled) configured for mounting step rail 410 to step brackets 430.

Step brackets 430 are fixed to frame brackets 420. For instance, a respective two of step brackets 430 may be welded to each frame bracket 420. Step rails 410 are mountable to step brackets 430. Thus, e.g., frame brackets 420 and step brackets 430 may form collectively form a support assembly for mounting step rails 410 of side rail kit 400 to frame GCF of golf cart G. Moreover, each step rail 410 may be mounted to frame GCF of golf cart G on a respective frame bracket 420 and step brackets 430 mounted to such frame bracket 420, as discussed in greater detail below.

With reference to FIG. 10, frame bracket 420 may include an elongated member 422. Elongated member 422 of frame bracket 420 may extend between a first end portion 450 and a second end portion 452, e.g., along the longitudinal direction L. Elongated member 422 of frame bracket 420 may be constructed of metal, such as a tubular or hollow metal body.

As noted above, frame bracket 420 may be mounted to frame GCF of golf cart G, e.g., side rail SR and/or cross rail CR of frame GCF. For example, side rail kit 400 may include a plurality of mounting tabs 440 for mounting frame bracket 420 to frame GCF of golf cart G, as described in greater detail below. Utilizing mounting tabs 440, frame bracket 420 may be mounted to frame GCF of golf cart G without drilling or otherwise modifying frame GCF of golf cart G.

Elongated member 422 of frame bracket 420 may be positioned against and/or extend between cross rails CR of frame GCF. As shown in FIG. 10, a respective one of mounting tabs 440 is mountable on each cross rail CR of frame GCF, e.g., within one or more holes defined in each cross rail CR. Bolts (not labeled) may extend through frame bracket 420 and be threaded onto mounting tabs 440 in order to fasten frame bracket 420 to frame GCF with mounting tabs 440. As shown in FIG. 10, e.g., the one of mounting tabs 440 with a threaded hole at a middle portion of the one mounting tab 440 may be disposed within both of the two holes defined by the cross rail CR of frame GCF having a U-shaped cross-section, e.g., within a plane that is perpendicular to the lateral direction A. Conversely, e.g., the one of mounting tabs 440 with two threaded holes at opposite end portions of the one mounting tab 440 may be disposed within the one hole defined by the cross rail CR of frame GCF having a generally L-shaped cross-section, e.g., within a plane that is perpendicular to the lateral direction A.

As noted above, step brackets 430 may be fixed to frame brackets 420. For instance, as shown in FIG. 10, when frame bracket 420 is fixed to frame GCF of golf cart G and step brackets 430 are mounted to frame bracket 420, step brackets 430 may extend, e.g., outwardly, from frame member 420. Moreover, a distal end portion 432 of each step bracket 430 may be spaced from frame bracket 420 along the lateral direction A.

Step rail 410 is mountable to step brackets 430. Step rail 410 may include an elongated member 412. Elongated member 412 of step rail 410 may extend between a first end portion 413 and a second end portion 414, e.g., along the longitudinal direction L. Elongated member 412 of step rail 410 may be oriented generally parallel (e.g., within fifteen degrees (15°) of parallel) to elongated member 422 of frame bracket 420 when step brackets 430 are mounted to frame bracket 410 and step rail 410 is mounted to step brackets 430. Elongated member 412 of step rail 410 may be constructed of metal, such as a tubular or hollow metal body.

Step rail 410 may include a step plate 415. Step plate 415 may be positioned between first and second end portions 413, 414 of elongated member 412 of step rail 410, e.g., along the longitudinal direction L. Step plate 415 may include a perforated panel 416 and a curved member 417. Curved member 417 may be mounted (e.g., welded) to elongated member 412 of step rail 410. Perforated panel 416 may be disposed between curved member 417 and elongated member 412 of step rail 410. As an example, perforated panel 416 may be an expanded metal panel, a perforated sheet metal panel, etc. Step rail 410 may further include a pair of mounting posts 418. Each mounting post 418 may be mounted to elongated member 412 of step rail 410 proximate a respective end of curved member 417. Each mounting post 418 may be also be positioned opposite the respective end of curved member 417, e.g., along the lateral direction A.

Using frame bracket 420 and step brackets 430, step rail 410 may be secured to frame GCF of golf cart G. For instance, frame bracket 420 may be mounted to frame GCF of golf cart G, e.g., using mounting tabs 440, as described above. With frame bracket 420 mounted in such a manner, step rail 410 may be securely mounted to frame GCF of golf cart G via frame bracket 420 and step brackets 430. In particular, step rail 410 may be fastened to step brackets 430. For instance, each mounting post 418 may be mountable to a respective step bracket 430 with a pair of bolts (not labeled) that extend through the mounting post 418 and step bracket 430 at the distal end portion 432 of the step bracket 430.

As may be seen from the above, step rail kit 400 includes features for securely mounting step rail 410 to frame GCF of golf cart G. In particular, side rail kit 400 may be configured to mount to or on frame GCF of golf cart G in order to provide step rail 410 on golf cart G. For instance, side rail kit 400 may be mounted to or on frame GCF of golf cart G without drilling or otherwise modifying frame GCF of golf cart G in order to provide step rail 410 on golf cart G. This advantageous over known step rail accessories that require drilling or otherwise modifying frame GCF or other components of golf cart G.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A side rail kit for a golf cart, comprising:
   a frame bracket mountable to a frame of the golf cart, the frame bracket comprising an elongated member that extends between a first end portion and a second end portion along a longitudinal direction;
   a plurality of U-bolts configured for mounting the frame bracket to the frame of the golf cart;
   a pair of step brackets mountable to the frame bracket, the step brackets extending from the frame member when the step brackets are mounted to the frame bracket, a distal end portion of each of the step brackets spaced from the frame bracket along a lateral direction when the step brackets are mounted to the frame bracket, the lateral direction being perpendicular to the longitudinal direction; and
   a step rail mountable to the step brackets, the step rail comprising an elongated member that extends between a first end portion and a second end portion along the longitudinal direction.

2. The side rail kit of claim 1, wherein the elongated member of the step rail is oriented generally parallel to the elongated member of the frame bracket when the step brackets are mounted to the frame bracket and the step rail is mounted to the step brackets.

3. The side rail kit of claim 1, wherein the frame bracket comprises a pair of step posts extending from the elongated member of the frame bracket along the lateral direction, each of the step brackets mountable to the frame bracket at a respective one of the step posts of the frame member.

4. The side rail kit of claim 3, wherein each of the step brackets defines a slot, each of the step brackets mountable to the respective one of the step posts of the frame member with a pair of bolts that extend through the respective one of the step posts and the slot of the step brackets.

5. The side rail kit of claim 1, wherein the frame bracket comprises an angled post extending from the elongated member of the frame bracket at the first end portion of the elongated member of the frame bracket, the angled post oriented at an angle $\alpha$ with respect to the elongated member of the frame bracket, the angle $\alpha$ being no less than one hundred and twenty degrees and no greater than one hundred and fifty degrees.

6. The side rail kit of claim 5, wherein the angled post comprises a mounting plate, one of the plurality of U-bolts mountable on the frame of the golf cart such that the frame of the golf cart is disposed between legs of the one of the plurality of U-bolts and the legs of the one of the plurality of U-bolts extend through the mounting plate of the angled post.

7. The side rail kit of claim 1, wherein the frame bracket comprises a stub post extending from the elongated member of the frame bracket along a transverse direction at the first end portion of the elongated member of the frame bracket, the transverse direction being perpendicular to the longitudinal and lateral directions.

8. The side rail kit of claim 7, wherein the stub post defines a curved recess at a distal end portion of the stub post, the curved recess configured for receipt of a rail of the frame of the golf cart.

9. The side rail kit of claim 7, wherein one of the plurality of U-bolts is mountable on the frame of the golf cart such that the frame of the golf cart and the stub post are disposed between legs of the one of the plurality of U-bolts and the legs of the one of the plurality of U-bolts extend through the frame bracket.

10. The side rail kit of claim 1, wherein the step brackets are fixed to the frame bracket.

11. The side rail kit of claim 10, further comprising a plurality of mounting tabs and a plurality of bolts, the mounting tabs positionable on the frame of the golf cart, the bolts configured for mounting the frame bracket to the frame of the golf cart, each of the bolts configured to extend through the elongated member of the frame bracket into a respective mounting tab when the mounting tabs are positioned on the frame of the golf cart.

12. The side rail kit of claim 1, further comprising a plurality of bolts configured for mounting the step brackets to the frame bracket and/or for mounting the step rail to the step brackets.

13. The side rail kit of claim 1, wherein the step rail comprises a step plate between the first and second end portions of the elongated member of the step rail along the longitudinal direction.

14. The side rail kit of claim 13, wherein the step plate comprises a curved member and a perforated panel, the curved member mounted to the elongated member of the step rail, the perforated panel disposed between the curved member and the elongated member of the step rail.

15. The side rail kit of claim 14, wherein the step rail comprises a pair of mounting posts, each of the mounting posts mounted to the elongated member of the step rail proximate a respective end of the curved member.

16. The side rail kit of claim 1, wherein the elongated member of the frame bracket and the elongated member of the step rail are constructed of metal.

17. A side rail kit for a golf cart, comprising:
a frame bracket mountable to a frame of the golf cart, the frame bracket comprising an elongated member that extends between a first end portion and a second end portion along a longitudinal direction;
a pair of step brackets mountable to the frame bracket, the step brackets extending from the frame member when the step brackets are mounted to the frame bracket, a distal end portion of each of the step brackets spaced from the frame bracket along a lateral direction when the step brackets are mounted to the frame bracket, the lateral direction being perpendicular to the longitudinal direction; and
a step rail mountable to the step brackets, the step rail comprising an elongated member that extends between a first end portion and a second end portion along the longitudinal direction; and
a U-bolt configured for mounting the frame bracket to the frame of the golf cart, the frame bracket comprising a mounting plate positioned proximate the second end portion of the elongated member of the frame bracket, the U-bolt mountable on the frame of the golf cart such that the frame of the golf cart is disposed between legs of the U-bolt and the legs of the U-bolt extend through the mounting plate of the frame bracket.

18. A side rail kit for a golf cart, comprising:
a frame bracket mountable to a frame of the golf cart, the frame bracket comprising an elongated member that extends between a first end portion and a second end portion along a longitudinal direction, the frame bracket comprising a stub post extending from the elongated member of the frame bracket along a transverse direction at the first end portion of the elongated member of the frame bracket, the transverse direction being perpendicular to the longitudinal direction;
a pair of step brackets mountable to the frame bracket, the step brackets extending from the frame member when the step brackets are mounted to the frame bracket, a distal end portion of each of the step brackets spaced from the frame bracket along a lateral direction when the step brackets are mounted to the frame bracket, the lateral direction being perpendicular to the longitudinal and transverse directions; and
a step rail mountable to the step brackets, the step rail comprising an elongated member that extends between a first end portion and a second end portion along the longitudinal direction; and
a U-bolt configured for mounting the frame bracket to the frame of the golf cart, the U-bolt mountable on the frame of the golf cart such that the frame of the golf cart and the stub post are disposed between legs of the U-bolt and the legs of the U-bolt extend through the frame bracket.

* * * * *